(12) United States Patent
Davies et al.

(10) Patent No.: US 7,124,654 B1
(45) Date of Patent: Oct. 24, 2006

(54) METHOD FOR DETERMINING A MICROACTUATOR RANGE OF MOVEMENT

(75) Inventors: Kenneth R. Davies, Gilroy, CA (US); David Terrill, Walnut Creek, CA (US); Jagdeep S. Buttar, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 63 days.

(21) Appl. No.: 10/956,234

(22) Filed: Sep. 30, 2004

(51) Int. Cl.
*G01N 33/00* (2006.01)
*G11B 5/58* (2006.01)

(52) U.S. Cl. .................. 73/866; 324/210; 324/212; 360/77.01

(58) Field of Classification Search ................. 73/866; 324/210, 212; 360/77.01
See application file for complete search history.

(56) References Cited

U.S. PATENT DOCUMENTS

| | | |
|---|---|---|
| 4,334,276 A | 6/1982 | Turnbull |
| 4,371,960 A | 2/1983 | Kroiss |
| 4,556,597 A | 12/1985 | Best et al. |
| 4,839,751 A | 6/1989 | Revels |
| 5,003,412 A | 3/1991 | Bizjak et al. |
| 5,095,471 A | 3/1992 | Sidman |
| 5,212,678 A | 5/1993 | Roth et al. |
| 5,253,131 A | 10/1993 | Chevalier |
| 5,381,281 A | 1/1995 | Shrinkle et al. |
| 5,400,201 A | 3/1995 | Pederson |
| 5,576,906 A | 11/1996 | Fisher et al. |
| 5,576,909 A | 11/1996 | Dierkes et al. |
| 5,615,065 A | 3/1997 | Cheung |
| 6,014,283 A | 1/2000 | Codilian et al. |
| 6,034,835 A | 3/2000 | Serrano |
| 6,078,445 A | 6/2000 | Serrano et al. |
| 6,452,990 B1 | 9/2002 | Leis et al. |
| 6,538,838 B1 | 3/2003 | Sacks et al. |
| 6,861,854 B1 * | 3/2005 | Guo et al. .................. 324/727 |

OTHER PUBLICATIONS

Che, Xiaodong, et al., "Utilization of Continuous PES Signal for H/M Component Characterizations," INTERMAG 2003—The 2003 IEEE International Magnetics Conference (Mar. 30-Apr. 3, 2003), Boston, Massachusetts, pp. 1-3.

* cited by examiner

*Primary Examiner*—Daniel S. Larkin
(74) *Attorney, Agent, or Firm*—Carr & Ferrell, LLP; Joshua C. Harrison, Esq.

(57) ABSTRACT

A spin stand testing system is used to determine a positioning range of a microactuator disposed on a head gimbal assembly. The microactuator is configured to laterally translate a read sensor of a head of the head gimbal assembly through the positioning range. The spin stand testing system includes a disk having a track, and a secondary mover configured to laterally translate the head gimbal assembly. During testing, a feedback loop keeps the read sensor locked to the track. While the read sensor remains locked, the head gimbal assembly is translated laterally. The microactuator translates the read sensor in an opposite direction until the microactuator reaches an end of its range, which is determined by monitoring a signal. The amount of translation of the head gimbal assembly by the secondary mover when the signal indicates the end of the range is the measured positioning range in one direction.

14 Claims, 4 Drawing Sheets

METHOD FOR DETERMINING A MICROACTUATOR RANGE OF MOVEMENT

BACKGROUND OF THE INVENTION

1. Field of the Invention

The disclosure relates generally to the field of magnetic disk drives, and more particularly to apparatus and methods related to testing disk drive components.

2. Description of the Prior Art

Magnetic disk drives are used to store and retrieve data for digital electronic apparatuses such as computers. A typical magnetic disk drive comprises a head, including a slider and a transducer, in very close proximity to a surface of a rotatable magnetic disk. The transducer, in turn, includes a write element and/or a read element. As the magnetic disk rotates beneath the head, a very thin air bearing is formed between the surface of the magnetic disk and an air bearing surface of the slider. The air bearing causes the head to "fly" above the surface of the magnetic disk with a separation ("fly height") that is typically less than 40 nanometers in contemporary disk drives. As the head flies over the magnetic disk, the write element and the read element can be alternately employed to write and read data bits along a magnetic "track" on the magnetic disk.

The head is positioned on the disk by a gimbaled suspension that comprises a load beam, gimbal, and swage mounting plate. Collectively, these three components and the head are frequently referred to as a Head Gimbal Assembly (HGA). The HGA is, in turn, attached to one end of an actuator arm. The other end of the actuator arm includes a winding of a conductor, called a voice coil. The actuator arm is mounted on a shaft situated between the voice coil and the load beam. In a disk drive, the voice coil is disposed between two strong permanent magnets. By adjusting the strength and the polarity of a current in the voice coil, the voice coil can be made to move between the permanent magnets. In this way the actuator arm is made to rotate around the shaft in order to control the position of the head relative to the disk to move between tracks.

Improvements in write elements have enabled increasingly higher track densities on the disk by writing tracks with increasingly more narrow track widths. Read elements have also been narrowed to match the more narrow track widths. As these dimensions have become smaller, what were once minor sources of error, such as disk run-out, have become significant obstacles to maintaining proper alignment between the head and the track. Accordingly, newer generations of disk drives are beginning to employ actuators located on the HGA in addition to the voice coil to keep the head aligned with the track. Depending on the particular location of the actuator on the HGA, these actuators are termed either milliactuators or microactuators. For example, actuators located on the swage mounting plate or load beam are typically referred to as milliactuators while actuators located on the slider or between the slider and the gimbal are typically referred to as microactuators. However, for convenience both milliactuators and microactuators will be referred to as "microactuators" for the remainder of this patent specification and the claims.

It will be appreciated that HGAs are highly complex and, accordingly, are preferably qualified before being assembled into disk drives. A spin stand is a common testing apparatus that has been developed for testing writing and reading characteristics of heads. Generally, the spin-stand includes a rotatable disk and a positioning device that secures the HGA. The positioning device allows the head to be moved to a desired position over the disk.

Accordingly, what is needed is a spin stand that is able to qualify milliactuators and micro actuators.

SUMMARY

An embodiment of the invention provides a method for using a spin stand testing system to measure a positioning range of a microactuator of an HGA. The microactuator of the HGA is configured to translate a read sensor of a head of the HGA through the positioning range. The method of the embodiment comprises locking the read sensor to a track on a disk of the spin stand testing system, and monitoring a signal, such as a position error signal or a derivative of a voltage applied to the microactuator, while translating the head gimbal assembly in a first direction until the signal deviates from a constant by more than a first threshold value. The positioning range of the microactuator, in some embodiments, is determined as being equal to a distance of translation of the HGA in the first direction when the signal deviates from the constant by more than the first threshold value. In an additional embodiment, the method further comprises repeating this procedure in the opposite direction and adding the two positioning ranges together to obtain a total positioning range.

In some embodiments locking the read sensor to the track includes using a feedback loop that can comprise a closed-loop servo. Locking the read sensor to the track can also include reading a two-frequency burst on the track, and in further embodiments the two-frequency burst is continuous around the track. Locking the read sensor to the track can also include controlling the microactuator to translate the read sensor in response to a difference between a read signal and a set point.

DETAILED DESCRIPTION

An embodiment of the invention uses a spin stand testing system to measure a positioning range of a microactuator disposed on an HGA. In addition to the microactuator, the HGA also includes a head having a read sensor. The microactuator is configured to laterally translate the read sensor through the positioning range. The spin stand testing system includes a disk having a track, a coarse positioning system for coarse positioning of the HGA relative to the disk, and a secondary mover configured to laterally translate the HGA relative to the disk.

During testing, the read element produces a read signal as it reads the track. Some or all of the track can encode positioning information so that the read signal can be used in a feedback loop for aligning the head with the track. When the feedback loop is active, the read signal is compared to a set-point or desired value. As the read signal deviates from the desired value, the feedback loop directs the microactuator of the HGA to reposition the read sensor in order restore the read signal to the desired value so that the read sensor properly follows the track. Such a feedback loop is known as a closed-loop servo, and the read sensor is said to be locked to the track when the closed-loop servo is keeping the read sensor aligned with the track.

In an embodiment of the invention, determining the range of motion of the microactuator begins by locking the read sensor to the track. While the read sensor is locked to the track, the secondary mover translates the HGA laterally. Because of the closed-loop servo, the microactuator on the HGA keeps the read sensor locked to the track by translating at least the transducer of the head in a direction opposite to the direction of the motion produced by the secondary mover. In other words, the microactuator cancels the motion of the secondary mover so that the read sensor remains locked to the track.

Eventually, however, the microactuator reaches an end of its range of motion. By monitoring a signal that is sensitive to the end of the microactuator's range of motion, such as the read signal, the range of the microactuator can be determined by how far the secondary mover had to translate the HGA before the end of the range was reached. To better understand the methods of the invention, an exemplary embodiment of a spin stand testing system for implementing an embodiment of the method is discussed with reference to FIGS. 1–3.

Figure 1:
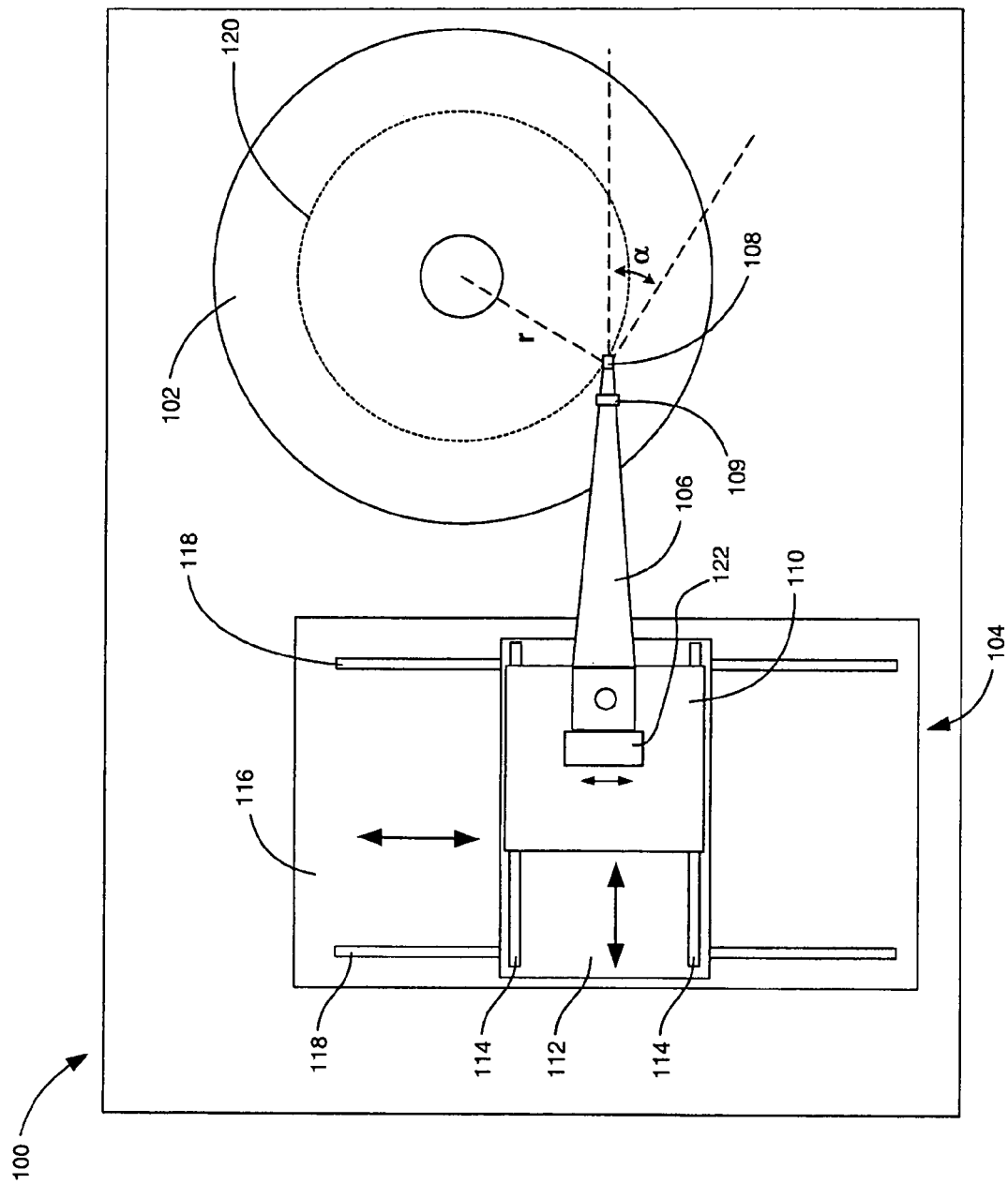
FIG. 1 shows an exemplary spin stand testing system for implementing an embodiment of the method of the invention.

FIG. 1 is a schematic illustration of an exemplary spin stand testing system 100. The spin stand testing system 100 comprises a disk 102 and a positioning device 104. The disk 102 is representative of a magnetic recording disk that would be used in a disk drive and is configured to rotate around an axis at a variable rotation rate. The positioning device 104 secures a HGA 106 that includes a head 108. The HGA 106 also includes a microactuator 109 that is configured to laterally translate a read sensor of the head 108, for instance, by translating the entire head 108 as shown, or by translating just a transducer of the head 108 that includes the read sensor.

The positioning device 104 is configured to position the head 108 to a desired position on the disk 102, for example, with a combination of coarse and fine positioners for translating the HGA 106. As shown in FIG. 1, the positioning device 104 comprises both coarse and fine positioners. The coarse positioning of the head 108 is performed by two platforms on orthogonal rail systems, while the fine positioning is performed by a secondary mover 122.

Turning first to the coarse positioners, the HGA 106 is secured to a base 110 on a first platform 112. The first platform 112 includes a set of rails 114 upon which the base 110 can move back and forth in a first direction relative to the first platform 112. A motor (not shown) is one example of a mechanism for driving the base 110 relative to the first platform 112. Similarly, the positioning device 104 also comprises a second platform 116 including a set of rails 118. In this embodiment the first platform 112 is configured to move upon the rails 118 relative to the second platform 116 in a second direction.

By moving the base 110 relative to the first platform 112, and by moving the first platform 112 relative to the second platform 116, the head 108 can be positioned at a desired disk radius, r, and skew angle, α (an angle formed between a longitudinal axis of the HGA 106 and a tangent to a radial line through the head 108). It will be appreciated, however, that various types of coarse positioning means, and not just that employed by the positioning device 104 to move the base 110 relative to the disk 102, may be used in accordance with embodiments of the invention.

In addition to the orthogonal rail system for coarse positioning, the positioning device 104 also includes the secondary mover 122. The secondary mover 122 provides a finer positioning capability in a lateral direction than is provided by the orthogonal rail system. The secondary mover 122 provides fine positioning, for example, through the use of an actuator based on a piezoelectric material. Preferably, the secondary mover 122 is able to move the head 108 in steps that are on the order of a micro-inch or less. Although shown as being disposed on the platform 110 and behind the HGA 106 in FIG. 1, the location of the secondary mover 122 relative to the HGA 106 is not critical to the invention so long as the secondary mover 122 is able to laterally translate the HGA 106 in order to make fine adjustments to the position of the head 108 relative to the track 120. Thus, in some embodiments, the secondary mover 122 can be positioned to a side of the HGA 106 or beneath the HGA 106.

In an operating disk drive, a closed-loop servo uses the microactuator 109 of the HGA 106 to keep the read sensor of the head 108 locked to a track on a disk. The microactuator 109 can serve the same purpose in the context of the spin stand testing system 100 during various measurements of the reading and writing capabilities of the head 108. Accordingly, the spin stand testing system 100 includes a feedback loop for keeping the read sensor locked to a track 120 on the disk 102. In some embodiments the feedback loop is a closed-loop servo.

During spin stand testing, the read element of the head 108 produces a read signal as it reads the track 120. Some or all of the track 120 encodes positioning information so that the read signal can be used in the feedback loop to keep the head 108 aligned with the track 120. When the feedback loop is active, the head 108 reads the positioning information and the feedback loop compares the read signal to a set-point or desired value. As the read signal deviates from the desired value, the feedback loop directs the microactuator 109 to reposition the read sensor of the head 108 in order to restore the read signal to the desired value. In this way the read sensor properly follows the track and the read sensor is said to be locked to the track.

Figure 3:
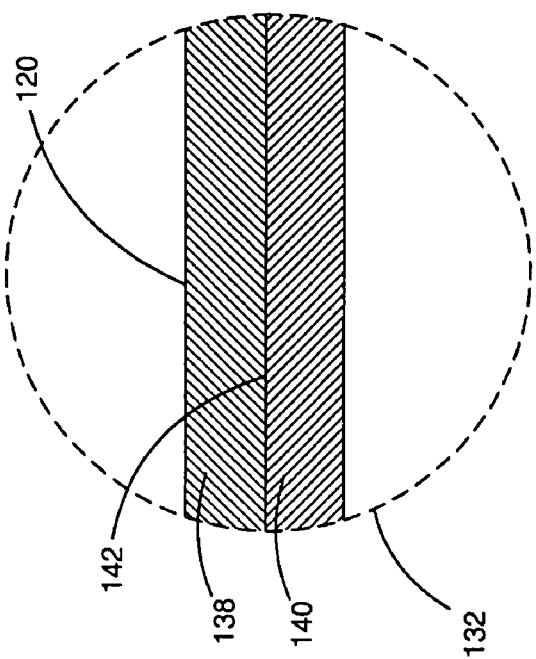
FIG. 3 shows a portion of the disk of the spin stand testing system of FIG. 2 in greater detail.
Figure 2:
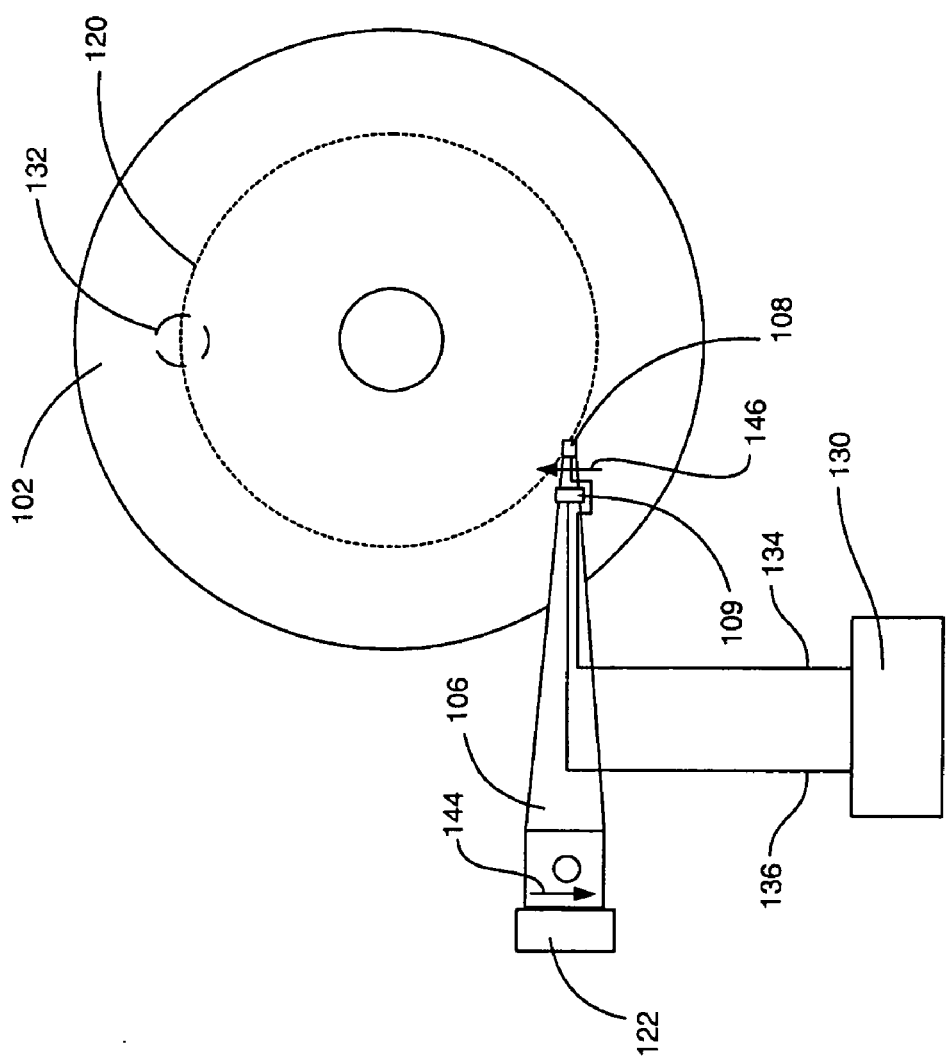
FIG. 2 shows certain components of the spin stand testing system of FIG. 1 to better illustrates an embodiment of the method of the invention.

To better explain a method of measuring a positioning range of the microactuator 109 according to an embodiment of the invention, FIG. 2 focuses on certain components of the spin stand testing system 100 (FIG. 1) and the HGA 106, while FIG. 3 illustrates a circled portion 132 of the disk 102 in greater detail to better illustrate an embodiment of the track 120. FIG. 2 schematically illustrates that the read sensor of the head 108 is kept locked to the track 120 by a controller 130 (not shown in FIG. 1). The controller 130 receives the read signal from the read element of the head 108 over a path 134. Based on the read signal, the controller 130 controls the microactuator 109 over a path 136 to laterally reposition the read sensor of the head 108. It will be appreciated that the controller 130 can either be a discrete component, as represented in FIG. 2, or can be integrated into the software or firmware of the spin stand testing system 100.

FIG. 3 shows the circled portion 132 of the disk 102 to better illustrate an embodiment of the track 120 in which the track includes two sub-tracks 138, 140 on opposite sides of a centerline 142. In the embodiment each sub-track 138, 140 encodes a signal at a different frequency. As noted elsewhere herein, some or all of the track 120 encodes positioning information so that the read signal can be used in the feedback loop to keep the head 108 aligned with the track 120. In this embodiment, the positioning information takes the form of the two parallel sub-tracks 138, 140 having different frequencies. The two parallel sub-tracks 138, 140 are referred to as a two-frequency burst where a length of the two parallel sub-tracks 138, 140 is less than a circumference of the track 120. In some embodiments, the track 120 includes a number of two-frequency bursts spaced at regular intervals. In some other embodiments the track 120 comprises a continuous two-frequency burst that is continuous around the circumference of the track 120.

When the read element of the head 108 (FIG. 2) reads the track 120 of FIG. 3, the read signal that is generated has a first component at the frequency of the sub-track 138, and a second component at the frequency of the sub-track 140. The two components can be deconvoluted from the read signal with appropriate electronic filtering. The amplitudes of the two frequency components are equal when the read element is centered over the centerline 142. However, when the read element is positioned over one sub-track more than the other, the amplitudes of the two frequency components become unequal. Accordingly, a difference between the amplitudes of the two frequency components increases as the read element moves further away from the centerline 142, and a polarity of the difference indicates to which side of the centerline 142 the read element is disposed. It will be appreciated that a ratio of the amplitudes of the two frequency components behaves similarly, where the ratio deviates from a value of 1 depending on which side of the centerline 142 the read element is disposed.

The difference between the amplitudes of the two frequency components is sometimes referred to as a position error signal (PES). Other types of signals that are analogous to the PES can also be read from the track 120 in other embodiments to keep the read sensor locked to the track 120. For example, in some embodiments the positioning information takes the form of servo bursts distributed around the track 120. A servo burst is a spatial arrangement of data bits on the track 120 that is asymmetrically arranged around the centerline 142. As is well known, servo bursts are placed at intervals on tracks in disk drives so that a closed-loop servo can be employed to keep the head aligned with the track. Accordingly, reading servo bursts along the track 120 will also produce a read signal that is useable by the controller 130.

Referring again to FIG. 2, an exemplary embodiment of the method for measuring the positioning range of the microactuator 109 comprises locking the read sensor of the head 108 to the track 120 and monitoring a signal while moving the HGA 106 in a first direction 144 until the signal deviates from a constant by more than a first threshold value. As detailed elsewhere herein, the read sensor is preferably locked to the track 120 by a feedback loop that uses the microactuator 109, and the HGA 106 is preferably moved by the secondary mover 122. An exemplary signal that can be monitored is the PES.

Figure 4:
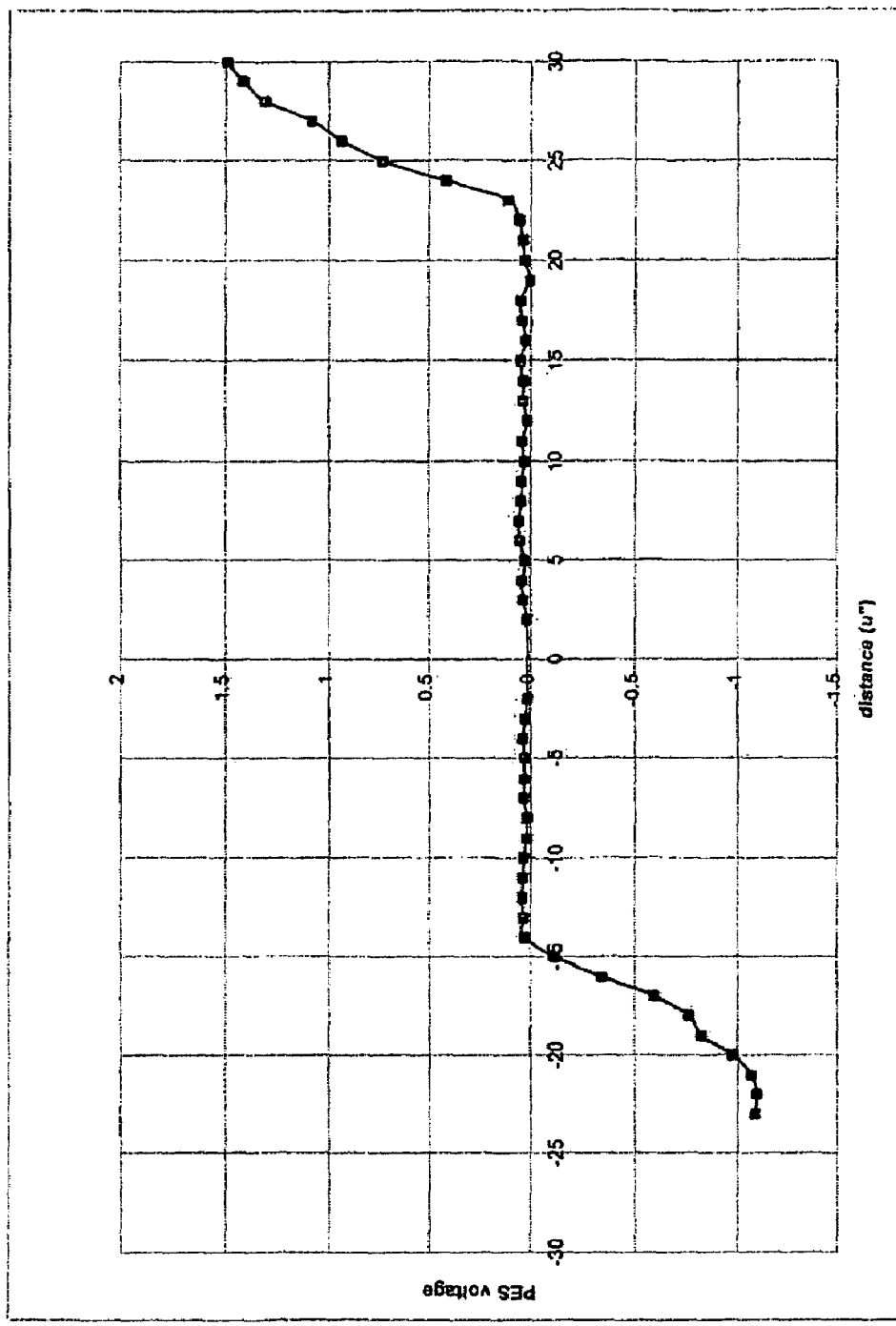
FIG. 4 shows a graph of a position error signal as a function of the displacement of a head gimbal assembly according to an embodiment of the invention.

FIG. 4 illustrates the dependence of the PES on the movement of the HGA 106 while the read sensor is locked to the track 120. In FIG. 4, the distance that represents the movement of the HGA 106 on the horizontal axis is preferably determined from the movement of the secondary mover 122 (FIG. 2), though other techniques can also be employed. It can be seen that when the HGA 106 is moved in either direction from a starting point (0 micro inches in FIG. 4) the PES value remains close to a constant value, in this instance, 0 volts. A generally constant PES signal while the HGA 106 is moving in the first direction 144 indicates that the microactuator 109 is moving the head 108 in an opposite direction 146 (FIG. 2) in order to keep the read sensor of the head 108 essentially centered over the centerline 142 (FIG. 3). However, when the microactuator 109 reaches an end of its positioning range the microactuator 109 can no longer compensate for the motion of the HGA 106 and the PES deviates from the constant as the head 108 begins to move laterally relative to the track 120.

Accordingly, the positioning range of the microactuator 109 in either direction is reached when the PES exceeds a threshold value for the direction. The threshold is preferably chosen to be far enough removed from the constant value so that it is not exceeded by noise. In some embodiments the positioning range of the microactuator 109 is measured in both directions 144, 146 and the two results are added together to derive a total positioning range of the microactuator 109. As an example, when the threshold in FIG. 4 is set at ±0.5 volts, it can be seen that the positioning range to the right of center is about 24 micro inches, and the positioning range to the left of center is about 17 micro inches. Thus, the microactuator under test in the graph of FIG. 4 has a total positioning range of about 41 micro inches.

It will be appreciated that the constant value (0 volts in FIG. 4) is determined by the feedback loop set by the controller 130 (FIG. 2). The feedback loop, which in some embodiments is a closed-loop servo, can also be set by the controller 130 to converge on other values. Accordingly, the controller 130 can be configured to keep the PES at 0.5 volts, for example, in which case the head 108 is kept aligned with the track 120, but the read element is not centered over the centerline 142 (FIG. 3) and instead is kept disposed to one side of the centerline 142 by some constant displacement.

It will also be appreciated that other signals besides the PES can be monitored according to some embodiments of the invention. For example, the signal sent from the controller 130 (FIG. 2) to the microactuator 109 (FIG. 2) over the path 136 will behave in a similar fashion to the graph shown in FIG. 4, in some embodiments. When the microactuator 109 includes a piezoelectric material, for instance, a voltage is applied to the piezoelectric material over the path 136 to actuate the microactuator 109, and a linear relationship exists between the applied voltage and an amount of translation by the microactuator 109 until the positioning range of the microactuator 109 is exceeded. Accordingly, the rate of change of the applied voltage over the path 136 as a function of the position of the HGA 106 (FIG. 2) will remain constant until the positioning range of the microactuator 109 is exceeded. Thus, another appropriate signal to monitor is a derivative of the applied voltage to the microactuator 109 as a function of the position of the HGA 106.

Figure 5:
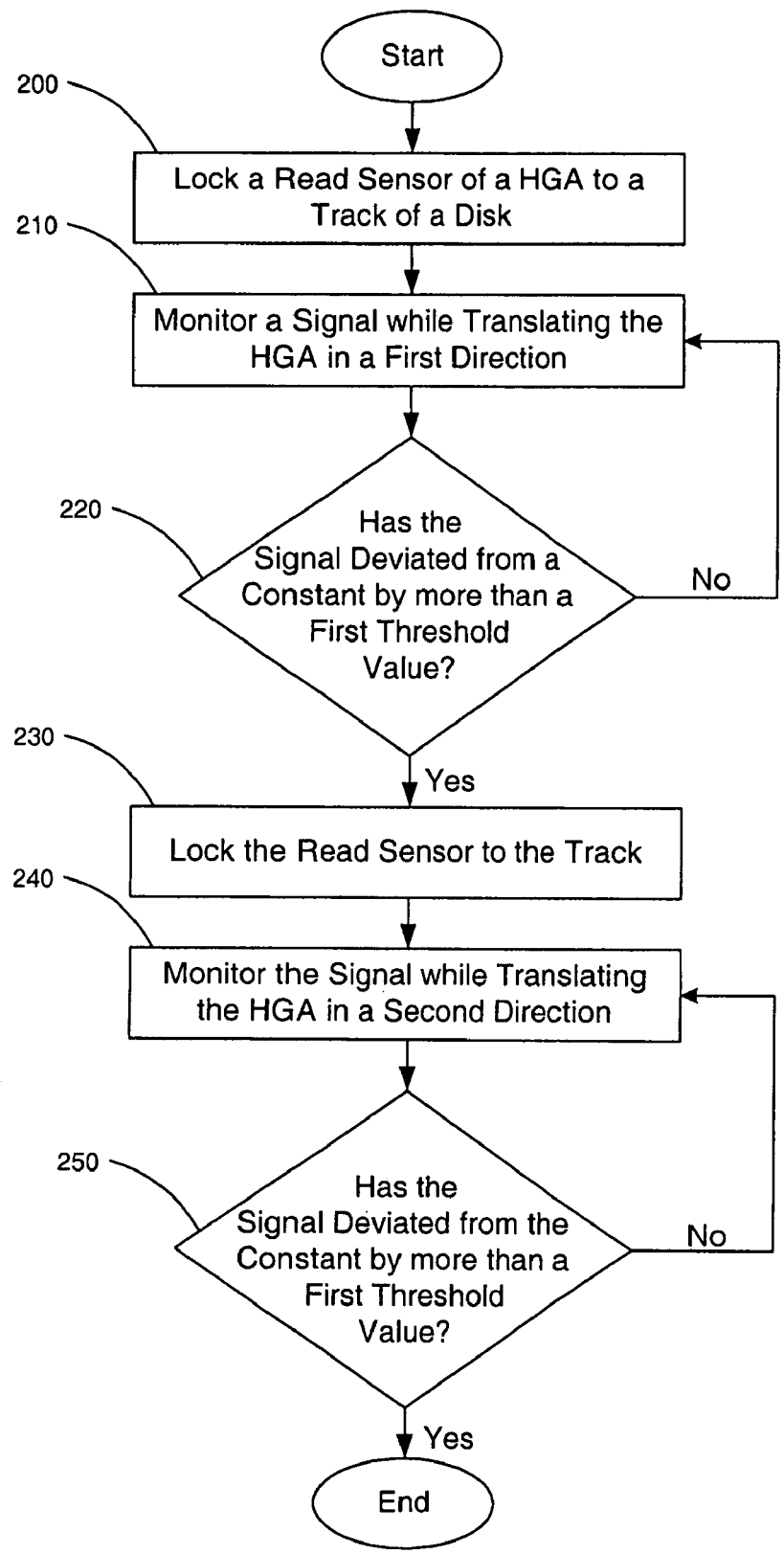
FIG. 5 shows a flow-chart of an exemplary method according to an embodiment of the invention.

An exemplary embodiment of the method of the invention is illustrated as a flow-chart in FIG. 5. In a step 200 a read sensor of an HGA is locked to a track on a disk of a spin stand testing system. This is accomplished by a microactuator under closed loop control. Then, in a step 210 a signal such as a PES signal is monitored while the HGA is translated in a first direction. Step 210 continues until a condition is satisfied, namely until the signal deviates from a constant by more than a first threshold value, as shown by decision 220. If the signal has not deviated from the constant by more than the first threshold value, then step 210 continues. As noted above, if the signal has deviated from the constant by more than the first threshold value, then the distance that the HGA was translated in step 210 is then considered to be a measure of a positioning range of a microactuator of the HGA in the first direction.

After the positioning range of the microactuator has been measured in the first direction, the process optionally can be repeated in a second, opposite, direction. Thus, in a step 230 the read sensor is again locked to the track by a microactuator under closed loop control. In some embodiments step 230 can include translating the HGA from an ending location at the end of step 210 to an initial location where the HGA was positioned at the beginning of step 210. Then, in a step 240 a signal such as a PES signal is again monitored while the HGA is translated in the second direction. Step 240 continues until a condition is satisfied, namely until the signal deviates from the constant by more than a second threshold value, as shown by decision 250. If the signal has not deviated from the constant by more than the second threshold value, then step 240 continues. If the signal has deviated from the constant by more than the second threshold value, then the distance that the HGA was translated in step 240 is then considered to be a measure of a positioning range of the microactuator in the second direction. A total positioning range can be determined from a sum of the positioning ranges in the first and second directions.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for using a spin stand testing system to measure a positioning range of a microactuator of a head gimbal assembly, the microactuator being configured to translate a read sensor of a head of the head gimbal assembly, the method comprising:
   locking the read sensor to a track on a disk of the spin stand testing system, and
   monitoring a signal while translating the head gimbal assembly in a first direction until the signal deviates from a constant by more than a first threshold value, whereby an amount of translation of the head gimbal assembly, measured from when the read sensor is locked until the signal deviates from the constant by more than the threshold value, correlates to the positioning range of the microactuator.

2. The method of claim 1 wherein locking the read sensor to the track includes using a feedback loop.

3. The method of claim 2 wherein the feedback loop comprises a closed-loop servo.

4. The method of claim 1 wherein locking the read sensor to the track includes reading a two-frequency burst.

5. The method of claim 4 wherein the two-frequency burst is continuous around the track.

6. The method of claim 1 wherein locking the read sensor to the track includes controlling the microactuator to translate the read sensor in response to a difference between a read signal and a set point.

7. The method of claim 1 wherein monitoring the signal includes monitoring a derivative of a voltage applied to the microactuator.

8. The method of claim 1 wherein monitoring the signal includes monitoring a position error signal.

9. The method of claim 1 further comprising determining the positioning range of the microactuator as equal to a distance of translation of the head gimbal assembly in the first direction when the signal deviates from the constant by more than the first threshold value.

10. The method of claim 9 further comprising
    locking the read sensor to the track, and
    monitoring the signal while translating the head gimbal assembly in a second direction opposite to the first direction until the signal deviates from the constant by more than a second threshold value.

11. The method of claim 10 wherein the first and second threshold values are about the same.

12. The method of claim 10 further comprising determining a total positioning range of the microactuator as equal to a distance of translation of the head gimbal assembly in the first direction when the signal deviates from the constant by more than the first threshold value plus a distance of translation of the head gimbal assembly in the second direction when the signal deviates from the constant by more than the second threshold value.

13. A method for using a spin stand testing system to measure a positioning range of a microactuator of a head gimbal assembly, the microactuator being configured to translate a read sensor of a head of the head gimbal assembly, the method comprising:
    locking the read sensor to a track on a disk of the spin stand testing system with a closed-loop servo, and
    monitoring a position error signal while translating the head gimbal assembly until the position error signal deviates from a constant by more than a threshold value.

14. The method of claim 13 wherein locking the read sensor to the track includes reading a two-frequency burst.

* * * * *